(12) United States Patent
Dugan et al.

(10) Patent No.: US 6,884,018 B1
(45) Date of Patent: Apr. 26, 2005

(54) COMBINATION SPORT VEHICLE LIFT AND CARRIER FOR MOTOR VEHICLE

(76) Inventors: Andrew L. Dugan, 521 E. 7th St., Wayne, NE (US) 68787; Paul Christiansen, 1030 Road 18, Pender, NE (US) 68047; William S. Wenke, 503 S. 6th St., Pender, NE (US) 68047

( * ) Notice: Subject to any disclaimer, the term of this patent is extended or adjusted under 35 U.S.C. 154(b) by 0 days.

(21) Appl. No.: 10/463,312

(22) Filed: Jun. 18, 2003

(51) Int. Cl.[7] .................................................. B60P 3/077
(52) U.S. Cl. ........................ 414/462; 414/540; 414/917
(58) Field of Search ........................ 414/462, 540–545, 414/917

(56) References Cited

U.S. PATENT DOCUMENTS

| | | | | |
|---|---|---|---|---|
| 5,536,130 A | * | 7/1996 | Edensor ...................... | 414/462 |
| 5,975,830 A | * | 11/1999 | Goodrich et al. ........... | 414/541 |
| 6,179,546 B1 | * | 1/2001 | Citrowske .................... | 414/558 |
| 6,364,597 B1 | * | 4/2002 | Klinkenberg ................ | 414/462 |
| 2001/0026756 A1 | * | 10/2001 | Mortimore ................... | 414/556 |

* cited by examiner

Primary Examiner—Janice L. Krizek
(74) Attorney, Agent, or Firm—Donald R. Schoonover

(57) ABSTRACT

A combination sport vehicle lift and carrier apparatus for a motor vehicle includes a mounting mechanism for releasably connecting to a conventional receiver hitch, a platform with a yoke mechanism for cradling a front wheel of a sport vehicle loaded on the platform and for supporting the sport vehicle, lifting mechanism for maintaining the platform in a horizontal orientation while selectively moving the platform to and from a loading configuration and a transporting configuration, and stabilizing mechanism for stabilizing the platform in the transporting configuration. The combination sport vehicle lift and carrier apparatus may also include an auxiliary conventional receiver hitch for towing purposes.

12 Claims, 4 Drawing Sheets

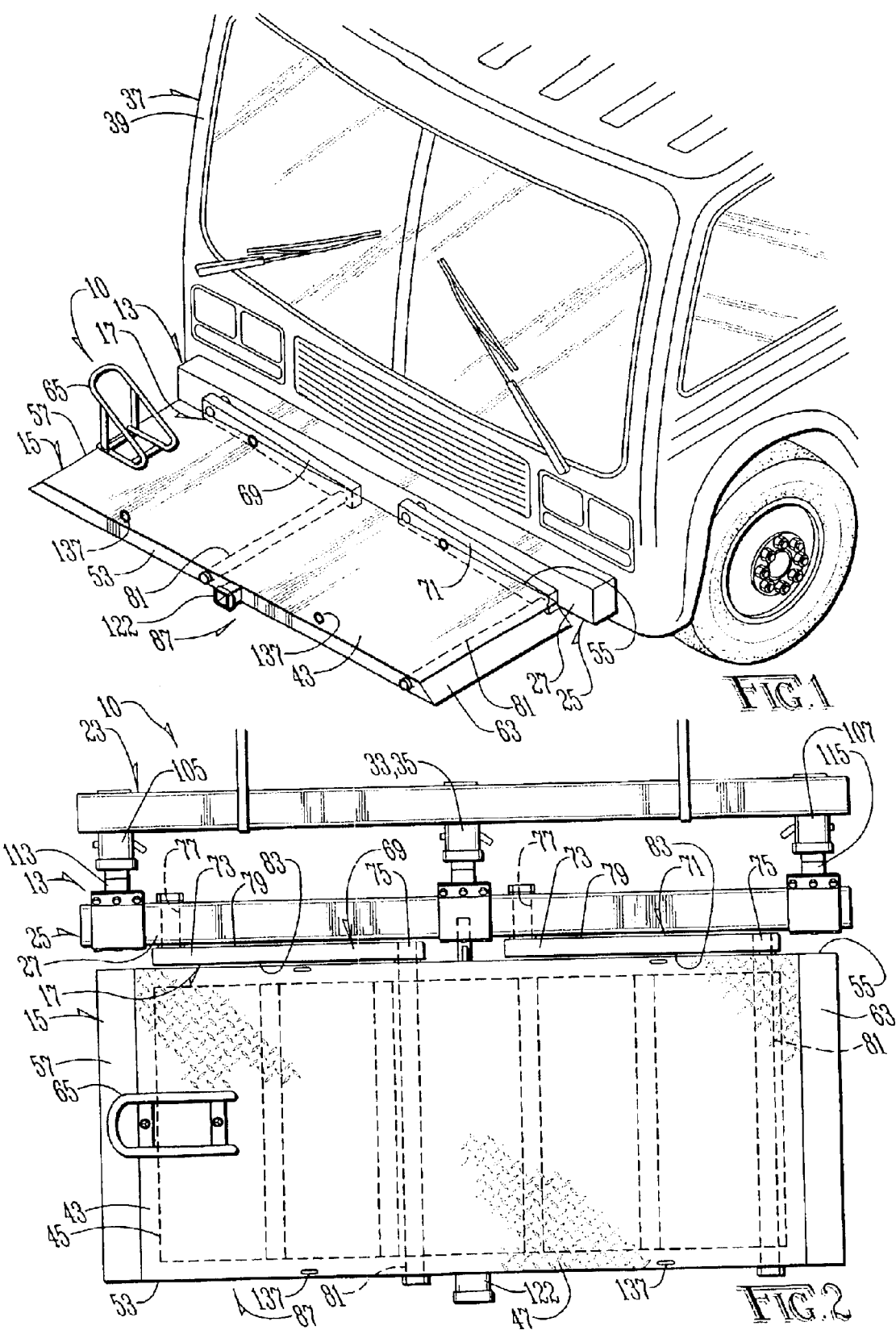

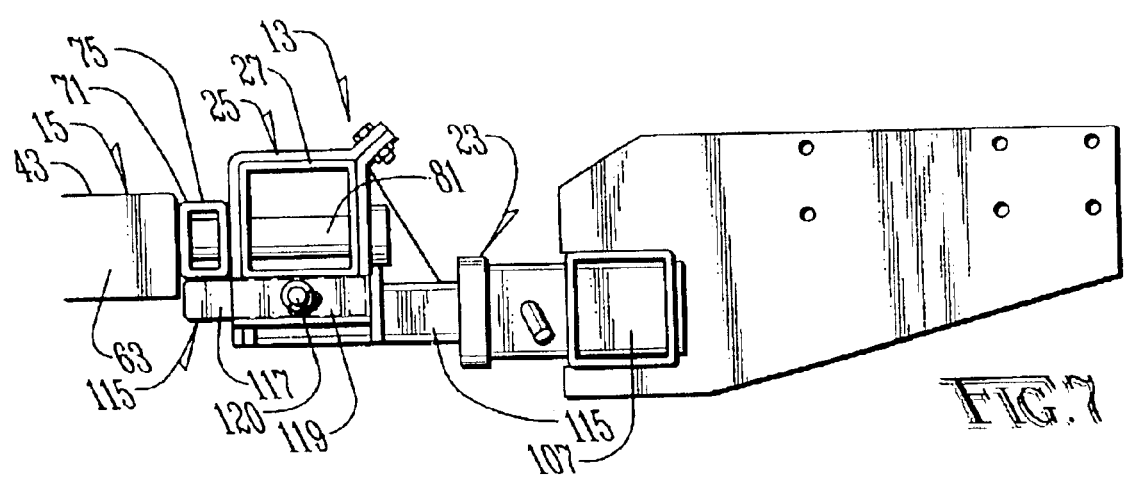

COMBINATION SPORT VEHICLE LIFT AND CARRIER FOR MOTOR VEHICLE

BACKGROUND OF THE INVENTION

1. Field of the Invention

The present invention is related to accessories for motor vehicles and more specifically, without limitation, to a motor vehicle accessory for loading and transporting a sport vehicle.

2. Discussion of the Related Art

Vacationing and traveling is an ever increasing diversion for almost everyone. Many of such people use motorhomes or other motor vehicles for mobility purposes. As the variety of recreation areas and facilities increase, so too does the desires of the people having access thereto to utilize those areas and facilities. As a result, many people wish to enhance their ability to more fully enjoy the available opportunities, such as having ready access to their own boat for water sports or fishing, or to their own motorcycle for access to areas not readily available to cars or pedestrians, for example.

Further, unlicenced a sport vehicle, such as a dirt bike, cannot legally be driven over a public highway system, such as to a motor bike or motorcycle rally. As a result, the unlicensed sport vehicle must be transported over the public highway system in the back of a pickup truck or on a trailer towed by another vehicle, which in both cases may not be the mode of choice if another alternative were available.

Although some sport vehicle carriers for motor vehicles are presently available, such carriers are not always convenient to use, operate in a manner that is somewhat dangerous for inexperienced users, or function in a manner that is not conducive to situations where available space adjacent to a motor vehicle is limited.

What is needed is a combination sport vehicle lifting and transporting apparatus that is convenient to use, operates in a manner that is not dangerous for inexperienced users, can function in a limited space adjacent to a motor vehicle, and provides an alternative choice for attending rallies with an unlicensed sport vehicle.

SUMMARY OF THE INVENTION

An improved system is provided for an apparatus for loading and transporting a sport vehicle, such as a motorcycle, on a motor vehicle. The improved apparatus generally includes a mounting mechanism, a platform, lifting means, and stabilizing means. The mounting mechanism includes a tubular extension structured to releasably connect to a conventional receiver hitch of a motor vehicle and is structured to have the appearance of a bumper. The platform includes an end structured as a ramp and a yoke mechanism structured to cradle a front wheel of a motorcycle loaded on the platform. The lifting means includes a pair of arms wherein each arm has a proximal end pivotally connected to the mounting mechanism and a distal end pivotally connected to the platform. The pair of arms are mounted in a parallelogram-type arrangement such that the platform is operatively maintained in a horizontal orientation as the platform is moved to and from a loading configuration and a transporting configuration. The lifting means also includes power means structured to move the platform to and from the loading configuration and the transporting configuration wherein the power means includes an electrically powered drive mechanism including a linear actuator or winch attached to the mounting mechanism, and a connecting means including a cable connecting the drive mechanism to the platform such that the platform is selectively movable to and from the loading configuration and the transporting configuration. The stabilizing means includes at least one releasable dead bolt mechanism structured to secure the platform in the transporting configuration, a pair of additional conventional receiver hitches attached to the frame of the motor vehicle and spaced transversely on opposing sides of the aforementioned conventional receiver hitch, and a pair of additional tubular extensions attached to the mounting mechanism and structured to releasably connect to the two additional conventional receiver hitches. The stabilizing means is structured to further stabilize the platform in the transporting configuration.

The improved apparatus may also include an auxiliary conventional receiver hitch attached to a distal side of the platform, wherein the auxiliary conventional receiver hitch is structured to be generally used for towing purposes or other desired purposes.

PRINCIPAL OBJECTS AND ADVANTAGES OF THE INVENTION

The principal objects of the invention include: providing a combination sport vehicle lifting and transporting apparatus for a motor vehicle; providing such an apparatus that operates in a manner that is not dangerous for inexperienced users; providing such an apparatus that can function in a limited space adjacent to a motor vehicle; providing such an apparatus whereby a user acting alone can safely load a sport vehicle on a motor vehicle; providing such an apparatus mounted on a motor vehicle that operatively maintains a supporting platform in a horizontal orientation at all times; providing such an apparatus mounted on a motor vehicle of choice to transport an unlicensed sport vehicle over a public highway system to a sport rally; and generally providing such an apparatus that is reliable in performance, capable of long lasting life, and particularly well adapted for the proposed usages thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a perspective view of a combination sport vehicle lift and carrier for a motor vehicle in a transporting configuration and mounted on the front of a motor vehicle, according to the present invention.

FIG. 2 is an enlarged top plan view of the combination sport vehicle lift and carrier for a motor vehicle and showing tubular extensions of stabilizing means thereof in phantom lines.

FIG. 7 is a further enlarged and fragmentary, end elevational view of the combination sport vehicle lift and carrier for a motor vehicle, showing a dead bolt mechanism thereof in a locking configuration, according to the present invention.

DETAILED DESCRIPTION OF THE INVENTION

Figure 3:
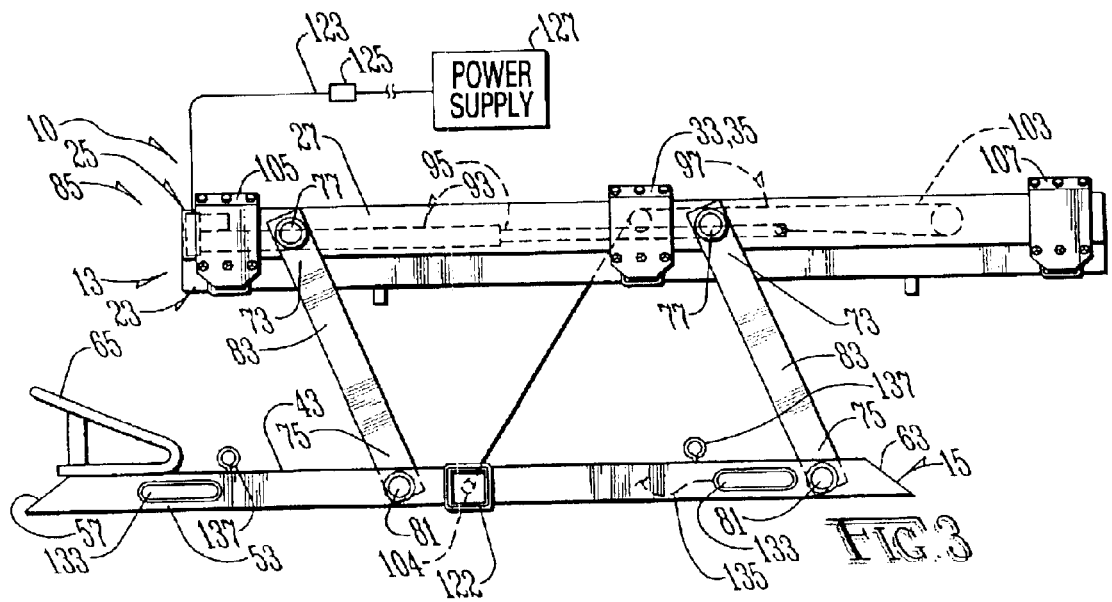
FIG. 3 is an enlarged side elevational and partially schematic view showing the combination sport vehicle lift and carrier for a motor vehicle in a loading configuration.

As required, embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for claims and as a representative basis for teaching one skilled in the art to variously employ the present invention in virtually any appropriately detailed structure.

The reference numeral 10 generally refers to a combination sport vehicle lift and carrier apparatus for a motor vehicle in accordance with the present invention, as shown in FIGS. 1 through 7. The combination lift and carrier apparatus 10 includes a mounting mechanism 13, a platform 15, lifting means 17, and stabilizing means 23.

The mounting mechanism 13 includes an outer portion 25 having the appearance of a bumper 27, such as a five-inch by seven-inch rectangular tube, or other suitable configuration. The mounting mechanism 13 also includes a tubular extension 33 that is structured to releasably connect to a conventional receiver hitch 35 of a motor vehicle 37, such as a motorhome for example. The receiver hitch 35 is sometimes described herein as if it already exists on the motor vehicle 37. If, however, a conventional receiver hitch does not already exist on the motor vehicle 37 or if the motor vehicle 37 has an existing conventional receiver hitch that is not properly placed for mounting the apparatus as herein described, it is to be understood that the hitch 35 is an integral part of the mounting mechanism 13 of the present invention.

It is to be understood that the conventional receiver hitch 35 may be located at either the front end 39 of the motor vehicle 37 or at the rear end 41 of the motor vehicle 37 so the combination sport vehicle lift and carrier apparatus 10 can be removably mounted either in front of, or behind, the motor vehicle 37. It is also to be understood that the conventional receiver hitch 35 may be located at the front end 39 of the motor vehicle 37 and another conventional receiver hitch 35 may be located at the rear end 41 of the motor vehicle 37 so, if desired, the location of the combination sport vehicle lift and carrier apparatus 10 can be readily changed from one end 39, 41 of the motor vehicle 37 to the other end 41, 39 of the motor vehicle 37.

The platform 15 includes a planar, horizontally oriented upper element 43 supported by an underlying supporting frame 45. Preferably, the upper element 43 has roughening elements 47 to provide greater resistance to sidewise slippage of the tires of a sport vehicle 49, such as a motorcycle 49, supported thereon.

The platform 15 includes a distal or outer side 53, a proximal or inner side 55, and a first end 57, each having a planar, downwardly depending plate-like structure, to not only provide an esthetic cover for the supporting frame 45 but also to provide further strengthening support for the upper element 43. The platform 15 also includes a planar second end 63 that extends downwardly and outwardly from the upper element 43 to provide a ramp 63 to simplify rolling a sport vehicle 49 onto the upper element 43 as hereinafter described. The platform 15 further includes a yoke mechanism 65 that is structured to cradle a front wheel 67 of a sport vehicle 49 supported on the platform 15. The yoke mechanism 65 is securely mounted on the upper element 43 of the platform 15 in the vicinity of the first end 57.

The lifting means 17 includes a pair of arms 69, 71. Each arm 69, 71 has a proximal end 73 and a distal end 75. A pin 77 extending transversely from a first side 79 of each arm 69, 71 near the proximal end 73 thereof is securely journalled to the mounting mechanism 13 such that each of the arms 69, 71 is pivotally connected to the mounting mechanism 13. Similarly, a pin 81 extending transversely from a second or opposing side 83 of each arm 69, 71 near the distal end 75 thereof is securely journalled to the platform 15 such that each of the arms 69, 71 is also pivotally connected to the platform 15. If desired for some applications, the pins 81 may extend substantially completely across the platform 15, as shown in FIG. 2.

Although pins 77, 81 have been described as being attached to arms 69, 71 and being journalled to the mounting mechanism 13 and the platform 15, respectively, it is to be understood that pins 77 may be attached to the mounting mechanism 13 and journalled to the arms 69, 71 and/or pins 81 may be attached to the platform 15 and journalled to the arms 69, 71.

Figure 4:
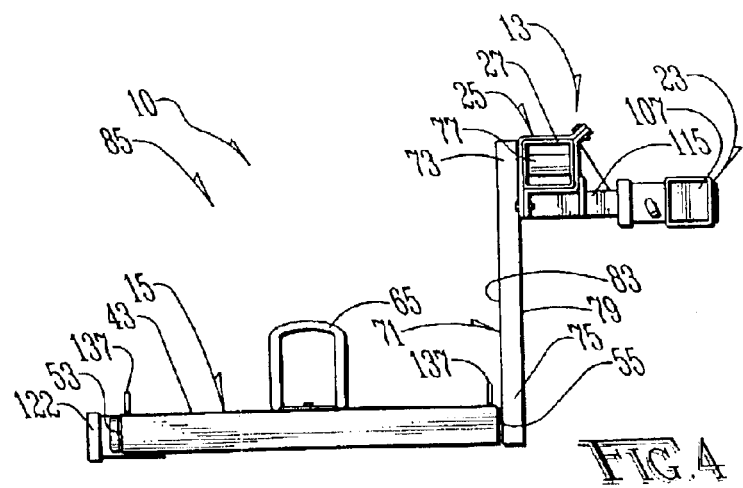
FIG. 4 is an enlarged end elevational view showing the combination sport vehicle lift and carrier for a motor vehicle in a loading configuration.
Figure 5:
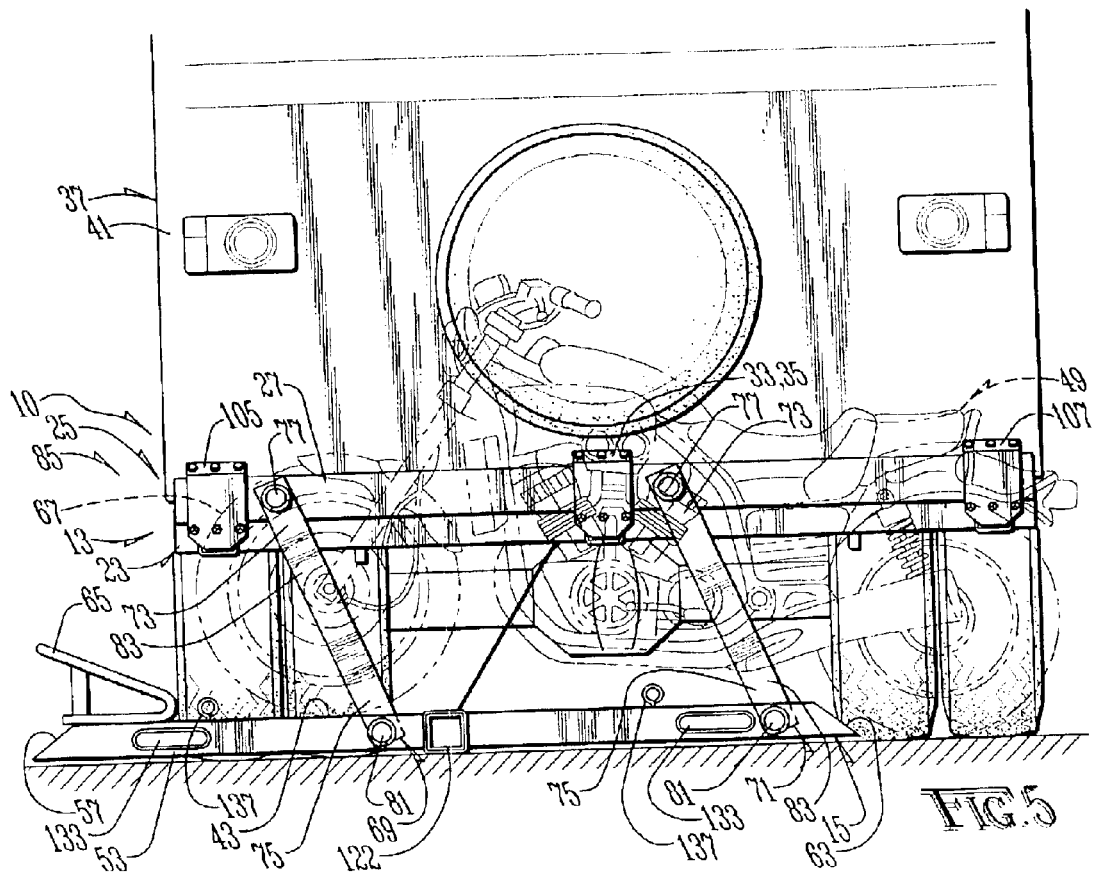
FIG. 5 is an end elevational view showing the combination sport vehicle lift and carrier for a motor vehicle in a loading configuration and mounted on the rear of a motor vehicle and showing a sport vehicle being mounted thereon.

The pair of arms 69, 71 are mounted in a parallelogram-type arrangement such that the arms 69, 71 move in a common vertical plane and the platform 15 is operatively maintained in a horizontal orientation as the platform 15 is moved to and from a loading configuration 85, as shown in FIGS. 3–5, and a transporting configuration 87, as shown in FIG. 1.

The lifting means 17 also includes power means 93 structured to move the platform 15 to and from the loading configuration 85 and the transporting configuration 87 wherein the power means includes an electrically powered drive mechanism 95, such as a linear actuator or winch 95 or other suitable mechanism, attached to the mounting mechanism 13, and connecting means 97, such as a cable 103, securely connecting the drive mechanism 95 to the platform 15 such as via a loop 104 fixedly attached to the platform 15, such that the platform 15 is selectively movable to and from the loading configuration 85 and the transporting configuration 87.

Figure 6:
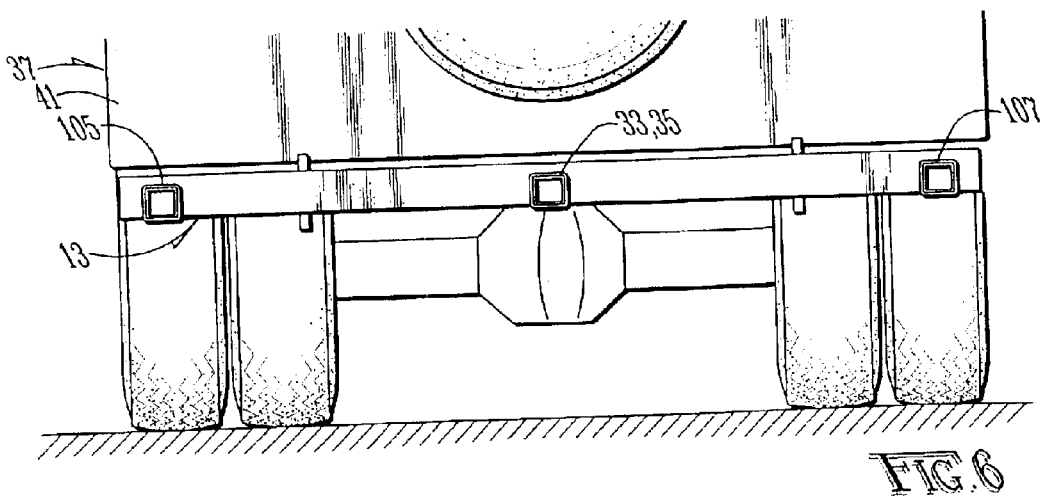
FIG. 6 is an elevational view showing conventional receiver hitches of the stabilizing means of the combination sport vehicle lift and carrier for a motor vehicle.

The stabilizing means 23 includes at least one conventional receiver hitch 105 in addition to the main conventional receiver hitch 35 hereinbefore described. Hitch 105 is spaced transversely from hitch 35. Preferably, the stabilizing means 23 also includes a second conventional receiver hitch 107 spaced on the opposing side of hitch 35. Hitches 105 and 107 are attached to the understructure of the motor vehicle 37 and are generally spaced from the ground equidistantly to the comparable spacing of hitch 35, as shown in FIG. 6. The stabilizing means 23 further includes one or more, as appropriate, additional tubular extensions 113, 114 attached to the mounting mechanism 13 and structured to releasably and cooperatively connect to the additional conventional receiver hitches 105 and 107, as shown in FIG. 2.

In addition, the stabilizing means 23 includes at least one releasable dead bolt mechanism 115 structured to secure the platform 15 in the transporting configuration 87. Each dead bolt mechanism 115 has an extendable plunger 117 that extends outwardly beneath the distal end 75 of a respective arm, either arm 69 or 71, when the platform 15 is in the transporting configuration 87 so the platform 15 is locked in the transporting configuration 87 and cannot return to the loading configuration 85 until the plunger 117 is retracted into a body 119 of the dead bolt mechanism 115. A pull pin 120 inserted through apertures that are aligned when the plunger 117 is extended, as shown in FIG. 7, locks the plunger 117 in an extended configuration. Preferably, the stabilizing means 23 includes at least one of the dead bolt mechanisms 115 for each of the arms 69 and 71.

It should now be obvious to a person having skill in the art that the various features of the stabilizing means 23 are structured to provide further stability to the platform 15 while the platform 15 is being moved from the loading configuration 85 to the transporting configuration 87 and while a sport vehicle 49 is being transported on the platform 15 with the platform 15 in the transporting configuration 87.

The apparatus 10 may also include an auxiliary conventional receiver hitch 122 attached to the outer side 53 of the platform 15. For applications where the apparatus 10 is mounted on the rear 41 of a motor vehicle 37, the hitch 122 may be used for towing purposes, such as for towing a small car, boat, or the like. For applications where the apparatus 10 is mounted on the front 39 of a motor vehicle 37, the hitch 122 may be used for suspending a hitch-mounted luggage or equipment carrier, or the like.

In an application of the present invention, the additional hitches 105 and 107 are securely attached to the understructure of the motor vehicle 37 on opposing sides of hitch 35. The hitches 35, 105 and 107 are mounted at the front or rear of the motor vehicle 37 depending on whether the apparatus 10 is to be mounted in front of, or behind, the motor vehicle 37. If desired, one set of the hitches 35, 105 and 107 may be installed at the front 39 of the motor vehicle 37 and another set of the hitches 35, 105 and 107 may be installed at the rear 41 of the motor vehicle 37 to provide the option of changing the mounting of the apparatus 10 from one end of the motor vehicle 37 to the other end. The hitches 35, 105 and 107 are spaced to simultaneously cooperatively mate with extensions 33, 113 and 114, respectively. The extensions 33, 113 and 114 are then securely connected to the hitches 35, 105 and 107 in a manner that is well known to those having skill in the art. Conductors 123, selectively controlled by a switch 125 such as a double-pole double-throw switch, connect the linear actuator or winch 95 in electrical communication with a power supply 127, such as the battery of the motor vehicle 37. If the apparatus 10 is equipped with stop, backup, tail, and/or directional turning lights 133, particularly if the apparatus 10 is mounted on the rear 41 of the motor vehicle 37, the lights 133 are connected via conductors 135 to the stop, backup, tail, and/or directional turning lights of the motor vehicle 37, as appropriate, such that the function of the stop, backup, tail, and directional turning lights 133 of the apparatus 10 will mimic the functions expected from the corresponding lights of the motor vehicle 37.

When it is desired to load a sport vehicle 49 on the apparatus 10, the switch 125 is closed to thereby supply electrical power to the linear actuator or winch 95 which responsively feeds out the cable 103 connected to the platform 15. As the cable 103 is being fed out by the linear actuator or winch 95, the platform 15 is gradually lowered to the loading configuration 85, thereby placing the platform 15 in close proximity to, or in abutting engagement with, the ground. As the platform 15 is being lowered to the loading configuration 85, the parallelogram-type mounting arrangement of the arms 69 and 71 continually maintain the platform 15 in a horizontal orientation. When the platform 15 has been sufficiently lowered to the loading configuration 85, a sport vehicle can be rolled onto the upper element 43 of the platform 15 via the ramp 63 such that a front wheel of the sport vehicle 49 is cradled in the yoke mechanism 65, which preferably approximately centers the sport vehicle 49 between the sides 53 and 55 of the upper element 43 of the platform 15.

After the sport vehicle 49 has been properly loaded on the platform 15, the switch 125 is again closed such that the linear actuator or winch 95 begins to retrieve the cable 103. As the cable 103 is being retrieved, the platform 15 with the sport vehicle 49 loaded thereon is elevated from the loading configuration 85 to the transporting configuration 87. Again, as the platform 15 is being so elevated, the parallelogram-type mounting arrangement of the arms 69 and 71 continually maintain the platform 15 in a horizontal orientation. When the platform 15 has reached the transporting configuration 87, the switch 125 is opened.

One or more dead bolt mechanisms 115 are then actuated to securely mechanically lock the platform 15 in the transporting configuration 87. A primary and essential objective of the dead bolt mechanisms 115 is to prevent the platform 15 from spontaneously and unexpectedly dropping from the transporting configuration 87 to the loading configuration 87 while the motor vehicle 37 is in motion.

Further securing devices, such as chains or tie-down straps for example, may be used to restrain the sport vehicle to the desired location on the platform 15 as the motor vehicle 37 transports the sport vehicle 49 on the platform 15. Tie-down hooks or loops 137 may be secured to the upper element 43 of the platform 15 to provide securing means for anchoring the chains or tie-down straps. The tie-down loops 137 may be permanently attached to the platform 15 or may be threadedly attached to the platform 16 via threaded bores so the tie-down loops 137 can be removed and stored when not being used.

It should now be obvious that a user working alone can single-handedly load and transport a sport vehicle 49.

If the apparatus 10 is mounted on the rear 41 of the motor vehicle 37, a small car, boat, or the like may be connected to the auxiliary hitch 122 to be towed by the motor vehicle 37 in tandem with the apparatus 10.

When the motor vehicle has reached a destination, such as a rally, and it is desired to unload the sport vehicle 49, the dead bolt mechanisms 115 are de-actuated thereby de-actuating the mechanism that mechanically locked the platform 15 in the transporting configuration 87. The switch 125 is then closed to such that the linear actuator or winch 95 feeds out the cable 103 to thereby lower the platform 15 with the sport vehicle 49 thereon from the transporting configuration 87 to the loading configuration 85. The tie-down straps are then removed and the sport vehicle 49 is rolled off the platform 15 via the ramp 63. Again, it should now be obvious that a user working alone can single-handedly unload a sport vehicle 49 by use of the apparatus 10. The platform 15 can then be returned to the transporting configuration 87 so the motor vehicle 37 can be used for other purposes. If further use of the apparatus 10 is not immediately planned, the tubular extensions 33, 113 and 114 can be disconnected from the hitches 35, 105 and 107 and the conductors 123 and 135 can be disconnected from the motor vehicle 37 so the apparatus 10 can be stored for future use.

It is to be understood that while certain forms of the present invention have been illustrated and described herein, it is not to be limited to the specific forms or arrangement of parts as described and shown.

What is claimed and desired to be covered by Letters Patent is:

1. An apparatus for transporting a sport vehicle on a motor vehicle, comprising:
   (a) a mounting mechanism having a tubular extension structured to releasably connect to a conventional receiver hitch attached to a motor vehicle;
   (b) a platform; and
   (c) lifting means including:
      (1) a pair of arms, wherein each arm has a proximal end pivotally connected to the mounting mechanism and a distal end pivotally connected to the platform, and wherein the pair of arms are mounted and structured to pivot in a common vertical plane as the platform is operatively displaced between a loading configuration and a transporting configuration while the platform is maintained in a horizontal orientation; and
      (2) power means including:
         (A) an electrically powered drive mechanism attached to the mounting mechanism;
         (B) connecting means connecting the drive mechanism to the platform such that the platform is selectively movable between the loading configuration and the transporting configuration; and
         (C) an electric power source for powering the drive mechanism.

2. The apparatus as described in claim 1, wherein the mounting mechanism is structured to have the appearance of a bumper.

3. The apparatus as described in claim 1, wherein the platform includes a yoke mechanism structured to cradle a front wheel of a motorcycle loaded on the platform.

4. The apparatus as described in claim 1, wherein the platform has an end structured as a ramp.

5. The apparatus as described in claim 1, wherein
   (a) the drive means includes a linear actuator having two opposing ends, wherein one end thereof is attached to the mounting mechanism; and
   (b) the connecting means includes a cable having two opposing ends wherein one end thereof is attached to the platform and the other end thereof is connected to the opposing end of the linear actuator.

6. The apparatus as described in claim 1, wherein
   (a) the power means includes a winch having two opposing ends wherein one end thereof is attached to the mounting mechanism; and
   (b) the connecting means includes a cable having two opposing ends wherein one end thereof is attached to the platform and the other end thereof is connected to the opposing end of the winch.

7. The apparatus as described in claim 1, further including stabilizing means having at least one releasable dead bolt mechanism structured to secure the platform in the transporting configuration.

8. The apparatus as described in claim 7, wherein the stabilizing means further includes:
   (a) at least one additional conventional receiver hitch attached to the frame of the motor vehicle and spaced transversely from the aforementioned conventional receiver hitch; and
   (b) at least one additional tubular extension attached to the mounting mechanism and structured to releasably connect to the at least one additional conventional receiver hitch; and
   wherein the stabilizing means is structured to further stabilize the platform in the transporting configuration.

9. The apparatus as described in claim 7, wherein the stabilizing means further includes:
   (a) two additional conventional receiver hitches attached to the frame of the motor vehicle and spaced transversely on opposing sides of the aforementioned conventional receiver hitch; and
   (b) the mounting mechanism having two additional tubular extensions attached to the mounting mechanism and structured to releasably connect to the two additional conventional receiver hitches.

10. An apparatus for transporting a sport vehicle on a motor vehicle, comprising:
   (a) a mounting mechanism having a tubular extension structured to releasably connect to a conventional receiver hitch of a motor vehicle and wherein the mounting mechanism is structured to have the appearance of a bumper;
   (b) a platform having:
      (1) a yoke mechanism structured to cradle a front wheel of a motorcycle loaded on the platform, and
      (2) an end structured as a ramp;
   (c) lifting means having:
      (1) a pair of arms, wherein each arm has a proximal end pivotally connected to the mounting mechanism and a distal end pivotally connected to the platform, and wherein the pair of arms is mounted in a parallelogram-type arrangement such that the platform is operatively maintained in a horizontal orientation as the platform is moved to and from a loading configuration and a transporting configuration,
      (2) power means including:
         (A) an electrically powered drive mechanism, including a linear actuator having two opposing ends wherein one end thereof is attached to the mounting mechanism;
         (B) connecting means, including a cable having two opposing ends wherein one end thereof is connected to the opposing end of the linear actuator and the opposing end thereof is connected to the platform such that the platform is selectively movable to and from the loading configuration and the transporting configuration, and
         (C) a power source for powering the drive mechanism;
   (d) stabilizing means including:
      (1) at least one releasable dead bolt mechanism structured to secure the platform in the transporting configuration,
      (2) two additional conventional receiver hitches attached to the frame of the motor vehicle and spaced transversely on opposing sides of the aforementioned conventional receiver hitch, and
      (3) the mounting mechanism having two additional tubular extensions attached to the mounting mechanism and structured to releasably connect to the two additional conventional receiver hitches, and
      (4) wherein the stabilizing means is structured to further stabilize the platform in the transporting configuration; and
   (e) an auxiliary conventional receiver hitch attached to a distal side of the platform and structured to be used for towing purposes.

11. An apparatus for transporting a sport vehicle on a motor vehicle, comprising:
   (a) a mounting mechanism having a tubular extension structured to releasably connect to a conventional receiver hitch attached to a motor vehicle;

(b) a platform;
(c) an auxiliary conventional receiver hitch connected to a distal side of the platform and structured to be used for towing purposes; and
(c) lifting means structured to:
  (1) mount the platform on the mounting mechanism and,
  (2) pivot the platform between a loading configuration and a transporting configuration while maintaining the platform in a horizontal orientation.

12. An apparatus for transporting a sport vehicle on a motor vehicle, comprising:
  (a) a mounting mechanism having a tubular extension structured to releasably connect to a conventional receiver hitch of a motor vehicle and wherein the mounting mechanism is structured to have the appearance of a bumper;
  (b) a platform having:
    (1) a yoke mechanism structured to cradle a front wheel of a motorcycle loaded on the platform, and
    (2) an end structured as a ramp;
  (c) lifting means having:
    (1) a pair of arms, wherein each arm has a proximal end pivotally connected to the mounting mechanism and a distal end pivotally connected to the platform, and wherein the pair of arms is mounted in a parallelogram-type arrangement such that the platform is operatively maintained in a horizontal orientation as the platform is moved to and from a loading configuration and a transporting configuration,
    (2) power means including:
      (A) an electrically powered drive mechanism, including a winch having two opposing ends wherein one end thereof is attached to the mounting mechanism;
      (B) connecting means, including a cable having two opposing ends wherein one end thereof is connected to the opposing end of the winch and the opposing end thereof is connected to the platform such that the platform is selectively movable to and from the loading configuration and the transporting configuration, and
      (C) a power source for powering the drive mechanism;
  (d) stabilizing means including:
    (1) at least one releasable dead bolt mechanism structured to secure the platform in the transporting configuration,
    (2) two additional conventional receiver hitches attached to the frame of the motor vehicle and spaced transversely on opposing sides of the aforementioned conventional receiver hitch, and
    (3) the mounting mechanism having two additional tubular extensions attached to the mounting mechanism and structured to releasably connect to the two additional conventional receiver hitches, and
    (4) wherein the stabilizing means is structured to further stabilize the platform in the transporting configuration; and
  (e) an auxiliary conventional receiver hitch attached to a distal side of the platform and structured to be used for towing purposes.

\* \* \* \* \*